United States Patent
Mondano et al.

(10) Patent No.: US 9,016,739 B2
(45) Date of Patent: Apr. 28, 2015

(54) HOUSEHOLD RETRIEVAL DEVICE

(71) Applicant: LifEase Products LLC, Lexington, MA (US)

(72) Inventors: Ruth Mondano, Lexington, MA (US); Mona Mondano, Lexington, MA (US); Ralph Mondano, Lexington, MA (US)

(73) Assignee: LifEase Products LLC, Lexington, MA (US)

( * ) Notice: Subject to any disclaimer, the term of this patent is extended or adjusted under 35 U.S.C. 154(b) by 0 days.

(21) Appl. No.: 14/329,022

(22) Filed: Jul. 11, 2014

(65) Prior Publication Data

US 2015/0015008 A1    Jan. 15, 2015

Related U.S. Application Data

(60) Provisional application No. 61/845,403, filed on Jul. 12, 2013.

(51) Int. Cl.
   *B25J 1/04*      (2006.01)
   *B25J 15/00*    (2006.01)
   *B25J 15/06*    (2006.01)

(52) U.S. Cl.
   CPC  *B25J 1/04* (2013.01); *B25J 15/008* (2013.01); *B25J 15/0608* (2013.01)

(58) Field of Classification Search
   CPC ............ B25J 1/02; B25J 1/04; B25J 15/008; B25J 15/0608; B25B 9/00
   USPC .................... 294/24, 65.5, 190, 212
   See application file for complete search history.

(56) References Cited

U.S. PATENT DOCUMENTS

| | | | |
|---|---|---|---|
| 3,374,022 A | 3/1968 | Tagg | |
| 4,073,530 A * | 2/1978 | Seidler | 294/212 |
| 4,105,239 A | 8/1978 | Akczinski, Sr. | |
| 4,575,143 A | 3/1986 | Nast | |
| 4,653,789 A | 3/1987 | McWilliams et al. | |
| 4,793,646 A | 12/1988 | Michaud, Jr. | |
| 5,273,329 A | 12/1993 | Wessel | |
| 5,647,623 A | 7/1997 | Shiao | |
| 6,065,787 A | 5/2000 | Jarosch | |
| 6,669,024 B2 * | 12/2003 | Ottens | 209/215 |
| 6,951,224 B2 | 10/2005 | Garrett | |
| 7,047,586 B2 * | 5/2006 | Shimada et al. | 15/104.002 |
| 8,827,335 B2 * | 9/2014 | Tortelli et al. | 294/2 |
| 2003/0173788 A1 * | 9/2003 | Fussell et al. | 294/19.1 |

\* cited by examiner

*Primary Examiner* — Dean Kramer
(74) *Attorney, Agent, or Firm* — Fish & Richardson P.C.

(57) ABSTRACT

A tool for retrieval of dropped and other items includes an elongated rod member having a first end and an opposite second end, with a handle mounted at the first end of the rod and defining a user gripping surface, and a retrieval member mounted at the second end of the rod and defining a lower planar retrieval surface. The retrieval member includes a magnet and the lower planar retrieval member surface defines a sticky surface region, both for attachment and retrieval of dropped and other items.

18 Claims, 10 Drawing Sheets

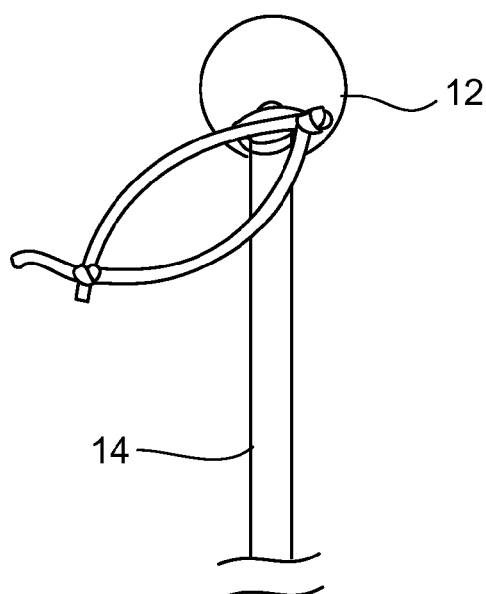
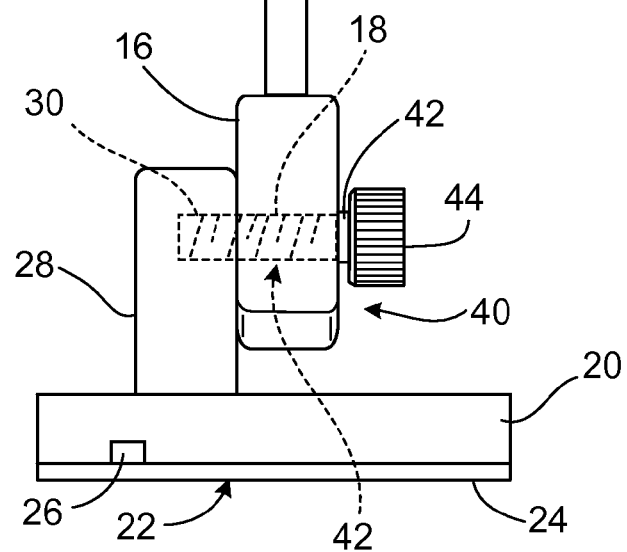
FIG. 3

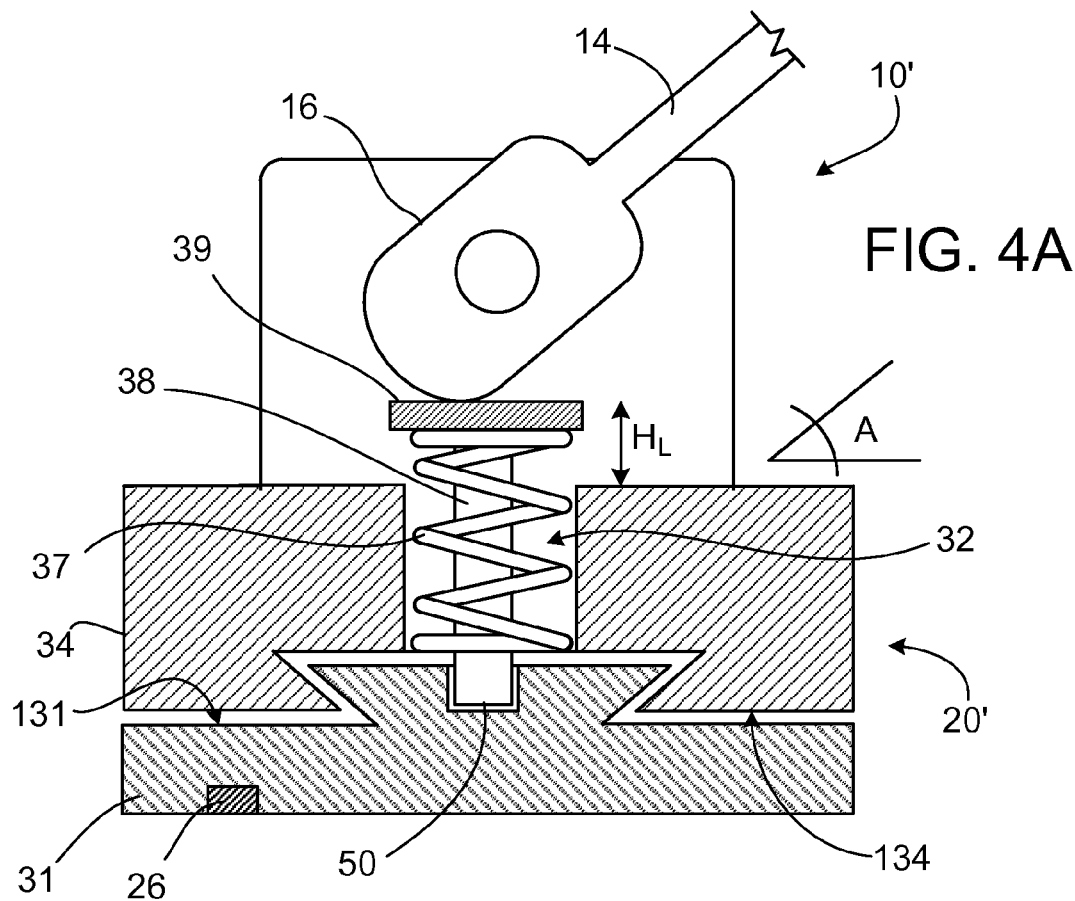
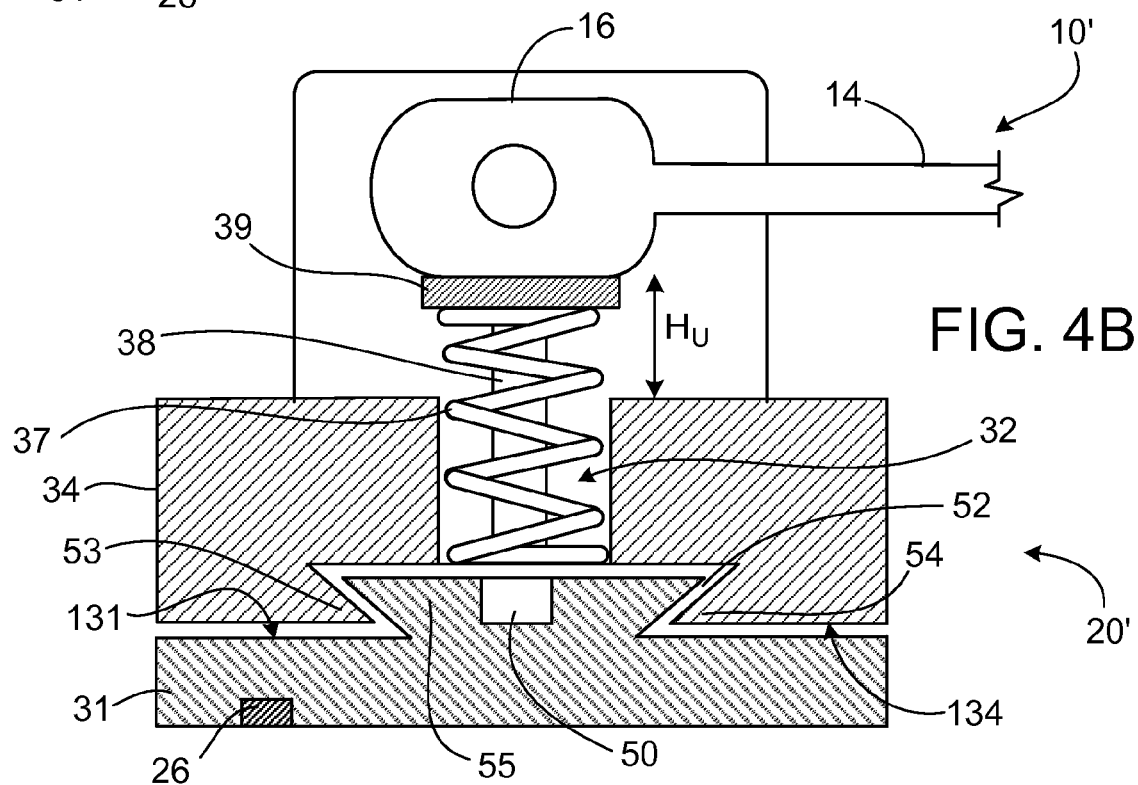

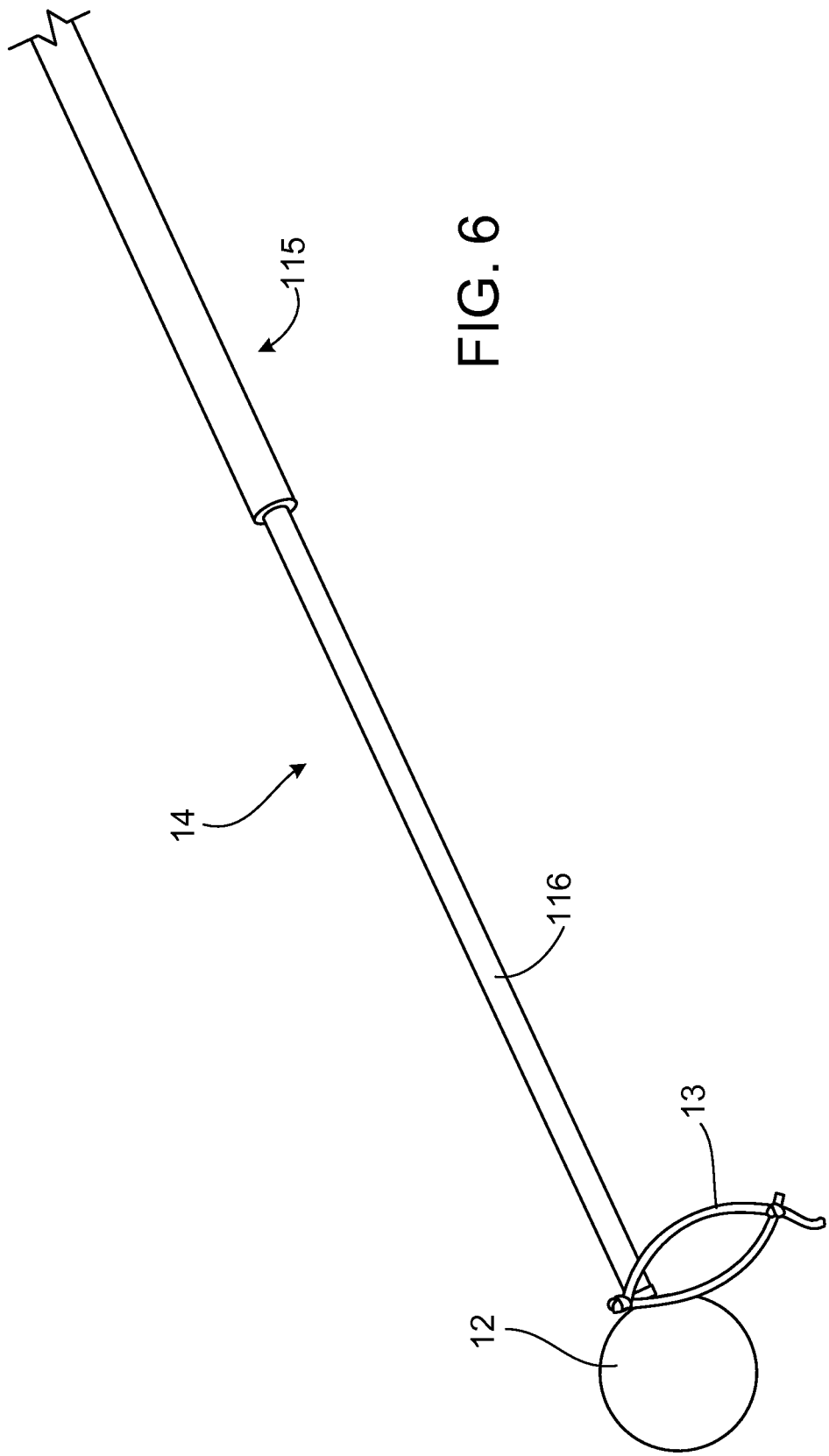

HOUSEHOLD RETRIEVAL DEVICE

CLAIM OF PRIORITY

This application claims the benefit of U.S. Patent Application Ser. No. 61/845,403, filed on Jul. 12, 2013, the entire contents of which are incorporated herein by reference.

TECHNICAL FIELD

This invention relates to household retrieval devices.

BACKGROUND

Persons having limited mobility often find it difficult in everyday life to retrieve smaller articles, e.g. [paperclips, coins, paper currency, checks, straight pins, crumbs, earrings other small items], that may fall to the floor or fall to or rest upon other difficult-to-reach surfaces about them. This difficulty may relate in particular to persons who are wheelchair bound, but it also relates to others who are physically limited or otherwise infirm, including those, e.g., with ailments such as multiple sclerosis or arthritis, or those otherwise at risk of falling.

SUMMARY

According to a one aspect of the disclosure, a retrieval tool comprises an elongated rod member having a first end and an opposite second end; a handle mounted at the first end of the rod and defining a user gripping surface; and a retrieval member mounted at the second end of the rod and defining a lower planar retrieval surface; the retrieval member comprising a magnet and the lower planar retrieval member surface defining a sticky surface region, both for attachment and retrieval of a dropped and other item.

Implementations of this aspect of the disclosure may include one or more of the following additional features. The retrieval tool comprises a pivot member disposed between the handle and the retrieval member and configured for adjustment of an angular relationship between the handle and the retrieval member surface. The retrieval member has a first body portion attached to the pivot member and a second body portion selectively separable from the first body portion. The second body portion comprises the magnet and the sticky surface region. The pivot member is selectively movable between a first position locking the second body portion to the first body portion and a second position unlocking the second body portion from the first body portion. In the first position of the pivot member, locking the second body portion to the first body portion, the rod member is in a nonzero angle relative to a horizontal top surface of the retrieval member. The sticky surface region comprises an elastomeric polymer. The retrieval member is a square block. The sticky surface region is removable. The elongated rod member is selectively variable in length, e.g. the elongated rod member is telescoping or foldable.

According to another aspect of the disclosure, a retrieval tool comprises an elongated rod member having a first end and an opposite second end; a handle mounted at the first end of the rod and defining a user gripping surface; retrieval member mounted at the second end of the rod and defining a lower planar retrieval surface; the retrieval member comprising a magnet and the lower planar retrieval member surface defining a sticky surface region, both for attachment and retrieval of a dropped and other item; a pivot member disposed between the handle and the retrieval member and configured for adjustment of an angular relationship between the handle and the retrieval member surface; the retrieval member having a first body portion attached to the pivot member and a second body portion selectively separable from the first body portion, the second body portion comprising the magnet and the sticky surface region; and the pivot member being selectively movable between a first position locking the second body portion to the first body portion and a second position unlocking the second body portion for removal from the first body portion.

Implementations of this aspect of the disclosure may include one or more of the following additional features. In the first position of the pivot member, locking the second body portion to the first body portion, the rod member is in a nonzero angle relative to a horizontal top surface of the retrieval member. The sticky surface region comprises an elastomeric polymer. The sticky surface region is removable, e.g. the sticky surface region is removable as a unit with said second body portion. The elongated rod member is selectively variable in length, e.g. the elongated rod member is telescoping or foldable.

According to another aspect of the invention, a retrieval tool comprises: an elongated rod member having a first end and an opposite second end; a handle mounted at the first end of the rod and defining a user gripping surface; and a retrieval member mounted at the second end of the rod and defining a cutout, the retrieval member comprising a magnet; a first loop-and-fastener pad disposed in the cutout; a second loop-and-fastener pad for attachment to the first loop-and-fastener pad; and a lower planar retrieval surface attached to the second loop-and-fastener pad, the lower planar retrieval surface defining a sticky surface region, both for attachment and retrieval of a dropped and other item.

The household retrieval device of the current disclosure thus advantageously permits a user to pick up small dropped or other items without the need to stoop or bend over. This is particularly advantageous to persons with reduced mobility who are unable to, or are unstable when, stooping or bending. The household retrieval device will also make it possible for those with limited mobility to pick up or reach small items that have fallen to the floor or are out of reach.

The details of one or more implementations of the disclosure are set forth in the accompanying drawings and the description below. Other features, objects, and advantages of the disclosure will be apparent from the description and drawings, and from the claims.

DESCRIPTION OF DRAWINGS

FIG. 3 is a front view of a pivotable portion of the household retrieval device of FIG. 1.

FIGS. 4A through 4C are side and respective front views of a locking arrangement for another implementation of the household retrieval device of FIG. 1.

FIG. 6 is a perspective view of an extendable handle of yet another implementation of the household retrieval device of FIG. 1.

Like reference symbols in the various drawings indicate like elements.

DETAILED DESCRIPTION

Figure 1:
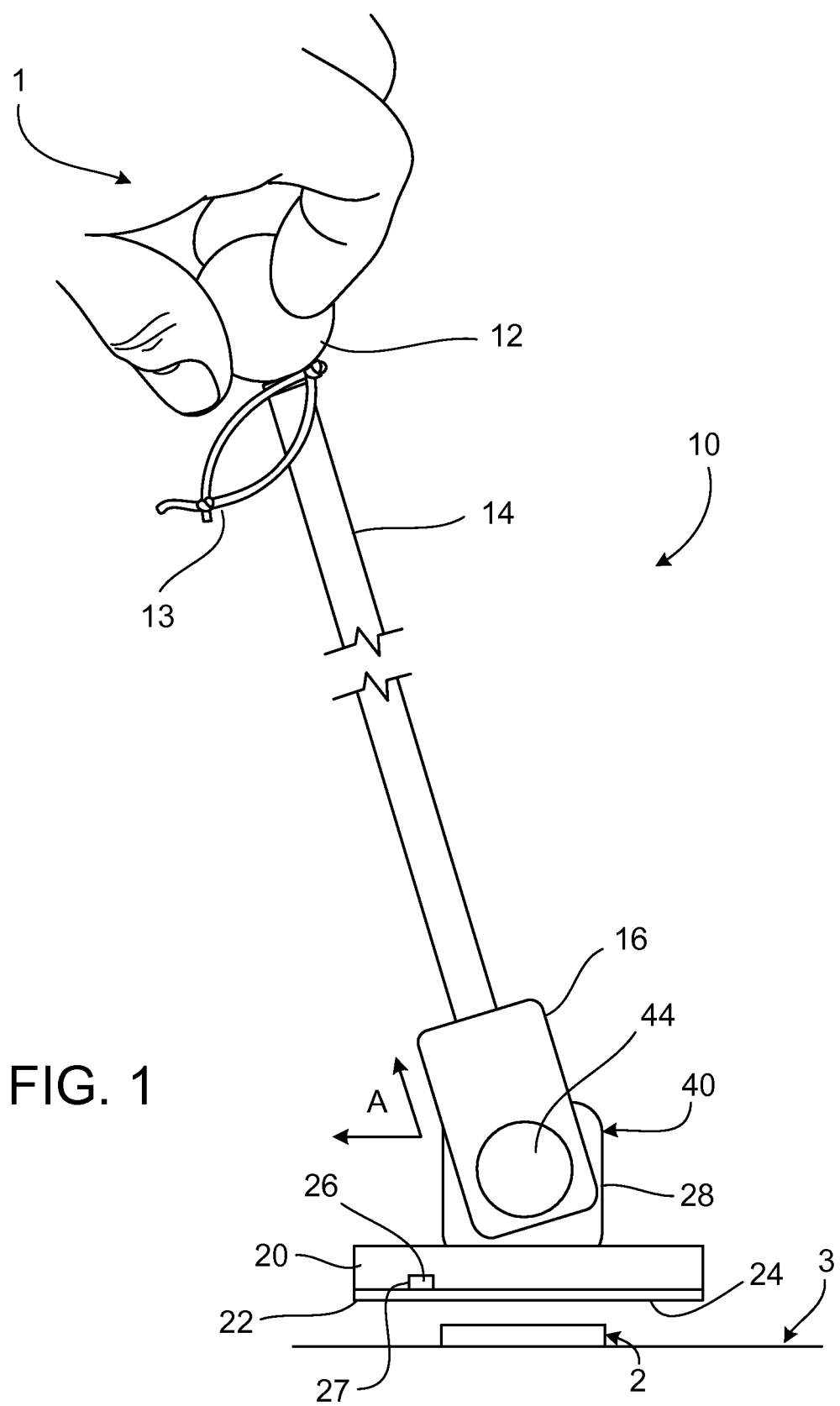
FIG. 1 is a perspective view of a household retrieval device of this disclosure.

As shown in FIG. 1, a household retrieval device 10 of the current disclosure enables a user 1 to retrieve a dropped or other item 2, here a piece of paper, from a planar surface 3, e.g., a floor. By way of example only, representative dropped and other items suitable for retrieval with the household retrieval device 10 may also include, e.g. paperclips, coins, paper currency, checks, straight pins, crumbs, earrings other small items. A user 1 grasps the retrieval device 10 by a handle 12 located at a first end of a rod 14. Rod 14 is dimensioned to span a manageable distance between the user's 1 hand and an area of the surrounding surface of the floor 3, e.g. while the user is either standing or seated, e.g., between 2 feet and 4 feet might be typical.

Pivotally attached at an opposite, second end of rod 14 is an attachment block 20 having a generally planar (e.g., flat) bottom or retrieval surface 22 disposed for engagement with or upon an exposed top surface of the dropped or other item 2 to be retrieved. The retrieval surface 22 of the attachment block 20 can be, e.g., a 2 inch by 2 inch square, although the retrieval surface itself may be rectangular, circular, or any other suitable shape.

The retrieval surface 22 of the attachment block 20 includes a sticky surface region 24, consisting of, e.g., a tacky elastomeric polymer. The properties of the sticky surface 24 are selected such that when a user 1 presses the sticky surface 24 of the attachment block 20 upon a dropped or other item 2, (e.g., a dropped item such as a sheet of paper), the item 2 is adhered to the sticky surface 24 and can be picked up and retrieved, e.g., from the floor 3. The properties of the sticky surface 24 are also chosen such that the dropped item 2 retrieved with the attachment block 20 can be easily removed. Sticky surface region 24 may be integral to the attachment block 20 or may be a removable surface that can be replaceable. Examples of suitable sticky or tacky materials include, e.g., Dow Chemical silicone elastomer, 3M double sided tape, sticky sheet pads from PMI, or Hydra-fasten family of adhesives from Royal Adhesives, South Bend, Ill.

In addition to the sticky surface 24, the attachment block 20 also includes a magnet 26 mounted to the attachment block 20, e.g. in a suitably-sized aperture 27 provided in or near the retrieval surface 22. The magnet 26 may be recessed from exposure at the retrieval surface 22, but have magnetic strength sufficient to attract and retain retrieved items upon the retrieval surface 22. The magnet 26 thus facilitates retrieval of small metal items, such as straight pins, sewing needles, hair pins, paper clips, etc.

Figure 2:
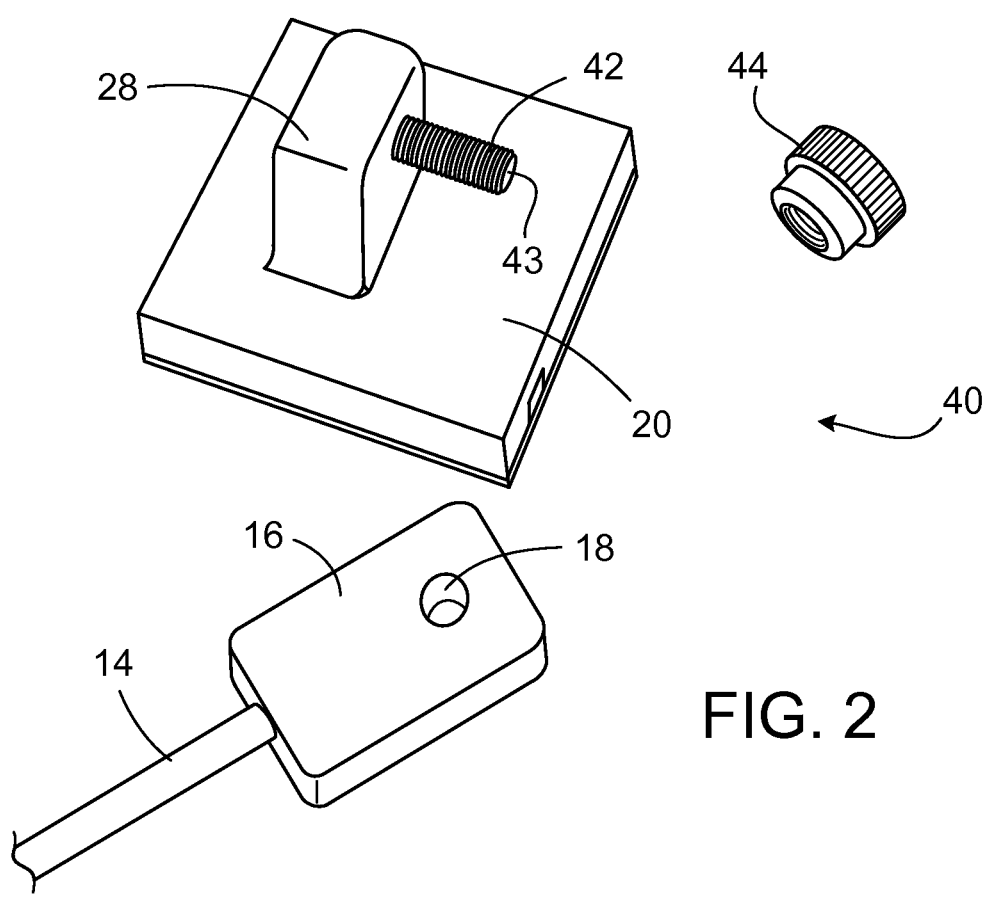
FIG. 2 is an exploded view of a pivotable portion of the household retrieval device of FIG. 1.

Referring to FIGS. 1 through 3, a pivot member 40 mounted at the second (lower) end of rod 14 and connected between the rod 14 and the attachment block 20 allows rotational adjustment at the block/rod connection at various angles, A, relative to the retrieval surface 22 of the attachment block 20. This arrangement enables retrieval of dropped and other items 2 with the household retrieval device 10, including items at different locations, including from surfaces that may be spaced both horizontally and vertically from the user.

In some embodiments, the pivot member 40 includes a rod extension portion 16 extending generally axially from a distal end of the rod 14 and a block extension portion 28 attached to or integral with a top surface of the attachment block 20. In one implementation (shown), a threaded bolt 42 extends through a hole 30 defined through the block extension 28. An exposed threaded end portion 43 of bolt 42 extends generally horizontally to be received through a hole 18 defined in the rod extension portion 16. A threaded nut or knob 44 is then secured over the exposed threaded end portion 43 of the bolt 42, thereby assembling the rod 14 and the attachment block 20 in a pivoting relationship. The rod 14 is then positioned as a desired angle, A, relative to the retrieval surface 22 of the attachment block 20, and the knob 44 is tightened to urge the rod extension 16 into engagement with block extension 28, thereby securing the desired angular relationship between rod 14 and surface 22. To select a different angular relationship of rod 14 with surface 22 of the attachment block 20, the knob 44 is simply loosened, the rod 14 and surface 22 are adjusted to a different angle, A, and then the knob 44 is retightened. The knob 44 is advantageously sized so that a person with reduced or minimal grasping ability can easily loosen and tighten the knob 44 for adjustment of angle, A. By providing an adjustable angle, A, between the rod 14 and surface of the attachment block 20, dropped and other items 2 can be retrieved at different distances and heights relative to the user 1; for instance, if the dropped or other item 2 has fallen under a chair, or on a generally planar (e.g. flat) surface at any angle from horizontal to vertical.

The handle 12 located at the first end of a rod 14 may be generally spherical in shape, such that a user can easily and comfortably grasp the handle 12 while applying downwardly-directed pressure in order to adhere the sticky surface region 24 of the attachment block 20 to the dropped or other item 2. Other handle shapes may also be selected, such as a cane handle, a prism, an elongated body, etc. In addition, a strap 13 may also be attached to the rod 14 in the vicinity of the handle 12, thereby allowing a user 1 to hang the household retrieval device 10 within easy reach, or even from, e.g., the user's wrist.

Figure 4C:
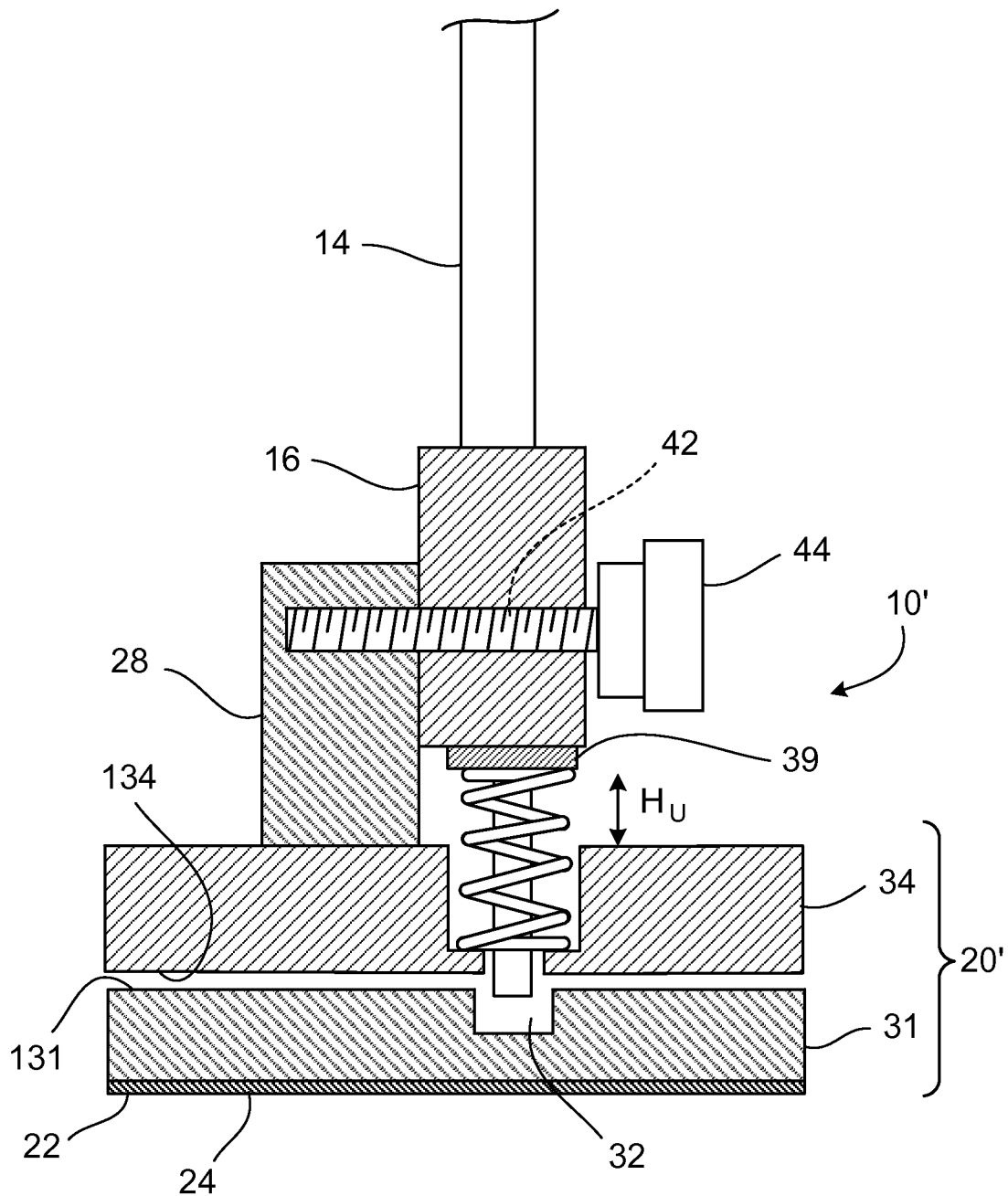

Referring now to FIGS. 4A through 4C, in another implementation of the retrieval device of the disclosure, a household retrieval device 10' has an attachment block 20' formed in two portions, i.e., a lower body portion 31, defining the retrieval surface 22, and an upper body portion 34, fixedly attached to, or, alternatively, integral with, block extension 28. The opposed joint surfaces 134, 131 of the upper and lower body portions 34, 31, respectively, are joined together by engagement in a dovetail joint 50. For example, in the implementation shown in the drawings, a groove 52 defined by opposed tails 53, 54 of the surface 134 of the upper body portion 34 is engaged by a dovetail-shape pin 55 defined by the opposed surface 131 of the lower body portion 31.

To ensure that the upper body portion 34 and lower body portion 31 remain in fixed engagement, a spring 37 is inserted in an appropriately-dimensioned, generally vertical spring hole 32 defined through the upper body portion 34 and into the lower body portion 31. When the attachment block is assembled, the hole 32 provides a continuous receiving hole for the spring 37, which is coaxially mounted to a dowel pin 38. An upper end of the spring 37 is fixed to a bearing plate 39 disposed at a height above the top surface of the attachment block 20 (i.e., the top surface of the upper body portion 34).

As shown in FIG. 4A, when the rod 14 is positioned at any angle, A, other than 0 degrees (i.e., at any angle other than horizontal with respect to the retrieval surface 22 of the attachment block 20'), the bearing plate 39 is a height $H_L$, which is a locked height greater than a critical unlocked height, $H_U$, shown in FIG. 4B. In this first, locked position (FIG. 4A), the rod extension 16 is positioned such that it presses against the bearing plate 39, and the resulting force is transmitted to compress the spring 37, thereby urging dowel pin 38 downward into the portion of the spring hole 32 defined by the lower body portion, thereby locking the lower body portion 31 in place relative to the upper body portion 34.

As shown in FIG. 4B, when the rod 14 is pivoted such that angle, A, is 0 degrees (i.e., horizontal with respect to the retrieval surface 22 of the attachment block 20), the bearing plate 39 reaches unlocked height, $H_U$, thereby reducing the compression force on the spring 37 to release dowel pin 38 from engagement in the lower portion of the spring hole 32 defined by the lower body portion 31. In this position, the lower body portion 31 is unlocked from the upper body portion 34. The pin portion 55 of the dovetail joint defined by the lower body portion 31 can then be slid along the groove 52 defined by the opposed tail portions 53, 54 of the dovetail joint defined by the upper body portion 34, releasing the lower body portion 31 from the household retrieval device 10. The sticky surface region 24 of the retrieval surface 22 may then be more easily cleaned or replaced, or an entirely new body portion 31 with a new retrieval surface 22 and sticky surface region 24 can be installed.

Figure 5:
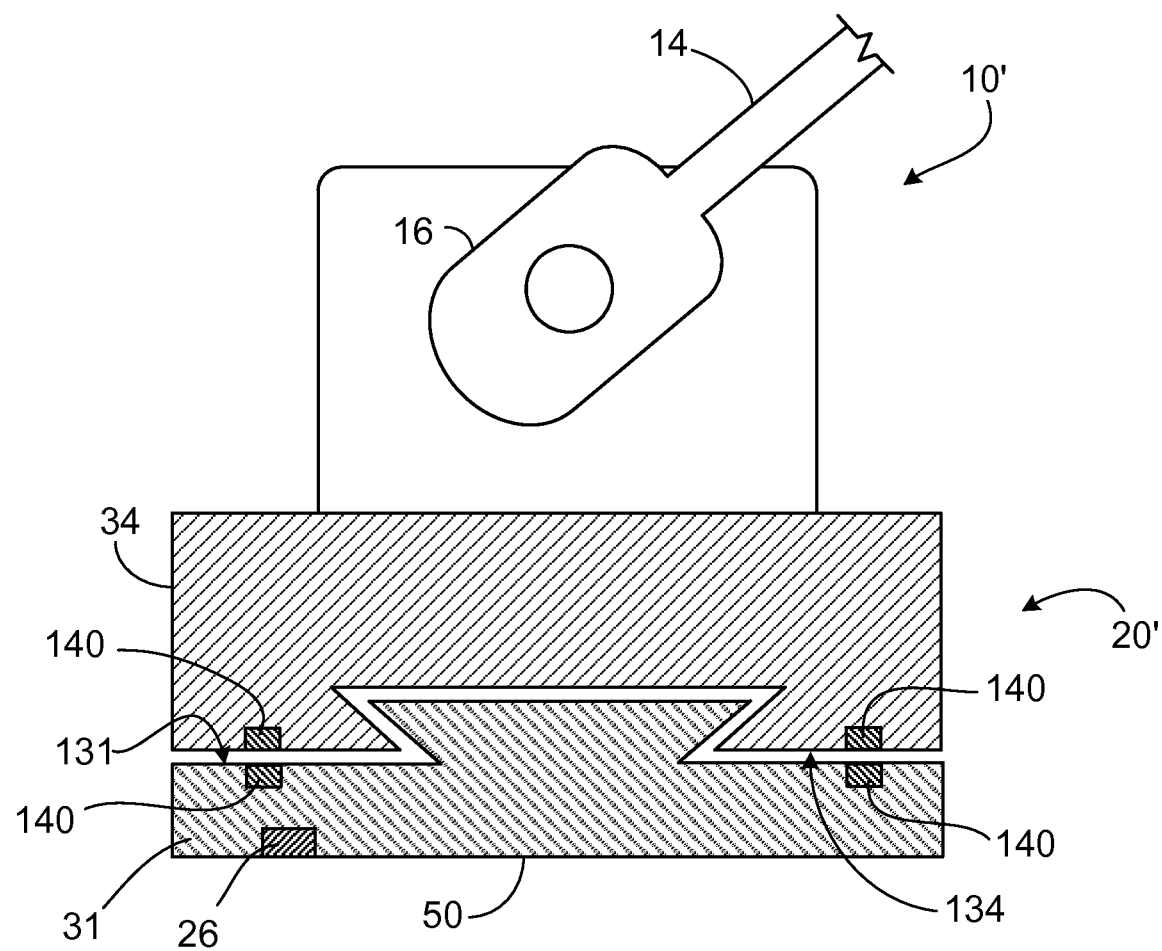
FIG. 5 is a side view of a magnetic locking arrangement for another implementation of the household retrieval device of FIG. 1.

Referring to FIG. 5, in another implementation of the retrieval device of the disclosure, an attachment block 20' of a household retrieval device 10' has a lower body portion 31, defining the retrieval surface 22, and an upper body portion 34, fixedly attached to, or, alternatively, integral with, block extension 28. The opposed joint surfaces 134, 131 of the upper and lower body portions 34, 31, respectively, are joined together by engagement in a dovetail joint 50. To ensure that the upper body portion 34 and lower body portion 31 remain in fixed engagement, locking magnets 140 are embedded in both the lower body portion 31 and upper body portion 34 near the opposed joint surfaces 131, 134. The locking magnets 140 on the upper body portion 34 align with the locking magnets 140 on the lower body portion 31 when the attachment block 20' is assembled, and their magnetic force maintains the attachment block 20' in the assembled configuration. One, two, or more locking magnets 140 may be embedded in each of the lower body portion 31 and upper body portion 34.

Elements of the household retrieval device 10 can be formed, e.g., of plastic, wood, or metal.

A number of implementations of the disclosure have been described. Nevertheless, it will be understood that various modifications may be made without departing from the spirit and scope of this disclosure. For example, in some implementations having a lower block portion that is removable for replacement of the sticky retrieval surface region 24, the pin element 55 of the dovetail joint 50 may be formed by the lower block portion 31 with the groove 52 formed by the upper block portion 35. In other implementations, the opposed surface 134 of the upper body portion 34 of the attachment block 20 may instead form the pin element 55 of the dovetail joint 50 with the groove 52 formed by the lower body portion lower body portion 31.

Also, although the rod 14 has been described as being solid rod or bar, it may instead have the form of a hollow tube. In still other implementations, the rod 14 may include two or more sections engaged in telescoping arrangement, e.g., for adjustably varying the length of the rod 14. For example, referring to FIG. 6, rod 14 may have at least first and second telescoping portions 116, 115, one or more of which is tubular and defines an internal passageway. A first telescoping rod portion 116 is slidable within the internal passageway of the second telescoping rod portion 115. A suitable fixing device, e.g. such a knob, screw, and hole configuration, can be provided for releasable fixing of the relative positions of telescoping rod portions 116, 115 and thus the length of rod 14. In other implementations, the rod 14 may be foldable to a compact length, e.g. in the manner of a foldable walking stick, including for ease of transportation or storage.

Figure 7A:
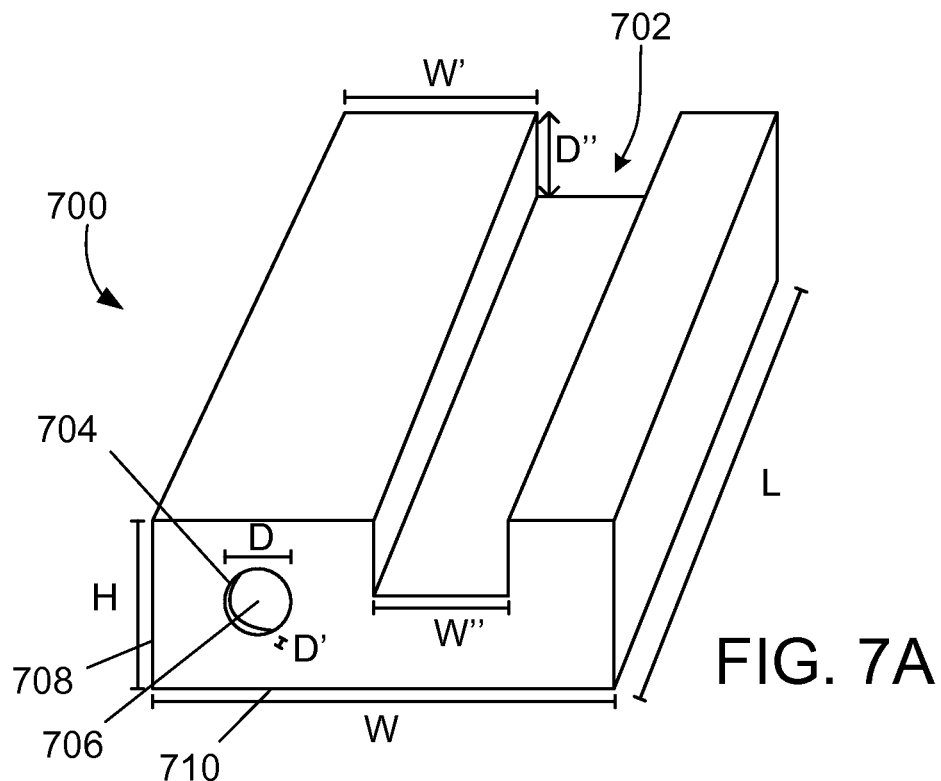
FIG. 7A is a top perspective view of another implementation of an attachment block of a household retrieval device of this disclosure.
Figure 7B:
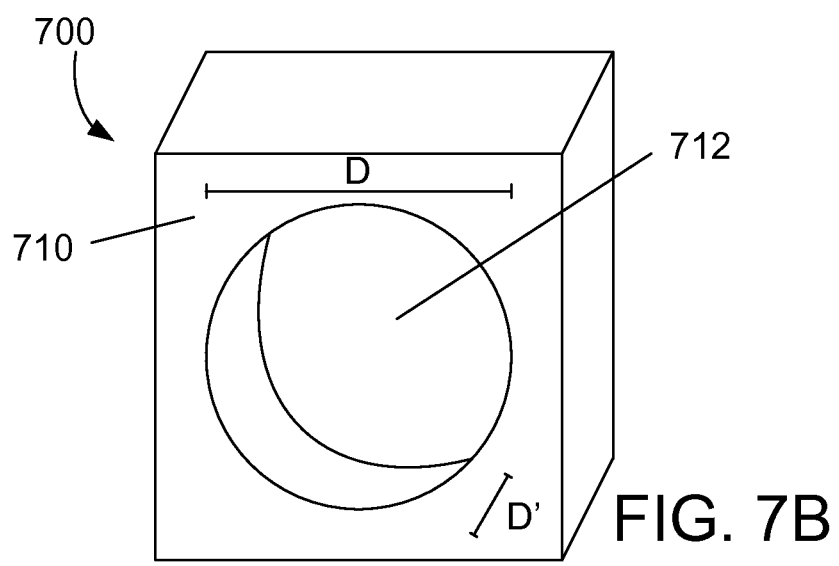
FIG. 7B is a bottom perspective view of the attachment block of FIG. 7A.

FIGS. 7A and 7B show another implementation of an attachment block 700 of a household retrieval device (e.g., the household retrieval device 10 and 10' of FIGS. 1-5). FIG. 7A is a top perspective view of the attachment block 700. The attachment block has a slot 702 for receiving a block extension portion (800 of FIG. 8) and defines a hole 704 for receiving a magnet. The magnet can be a disc that has magnetic strength sufficient to attract and retain smaller metal items.

The attachment block 700 has a length, L, e.g., of about 2 inches, a width, W, e.g., of about 2 inches, and a height, H, e.g., of about ⅝ inch. The hole 704 has a diameter, D, e.g., of about 5/16 inch and a depth, D', e.g., of about 3/16 inch. The slot 702 runs along the length, L of the attachment block 700, has a depth, D", e.g., of about ¼ inch, and a width, W", e.g., of about ½ inch. A center of the hole 706 is positioned, e.g., about ½ inch from a left surface 708 of the attachment block 700 and about 3/16 inch from a bottom surface 710 of the attachment block 700. The width, W', from the left surface 708 of the attachment block 700 to the slot 702 is, e.g., about 1 inch.

FIG. 7B shows a bottom perspective view of the attachment block 700. A cutout (e.g., a circular cutout 712) is defined by the bottom surface 710 of the attachment block 700. The circular cutout 712 has a diameter, D, e.g., of about 1½ inches and a depth, D', e.g., of about ⅛ inch. The circular cutout 712 can be centered on the bottom surface 710 of the attachment block.

The circular cutout 712 is configured to accept an attachment mechanism. In some examples, the attachment mechanism is a loop-and-fastener pad. The attachment mechanism can have a thickness, e.g., about 1/32 inch to ⅛ inch. As such, the attachment mechanism can either reside entirely beneath the bottom surface 710 of the attachment block 700 or reside even with the bottom surface 710 of the attachment block 700. In some examples, a portion of the attachment mechanism can protrude beyond the bottom surface 710 of the attachment block 700.

The attachment mechanism is configured to attach to a second attachment mechanism (e.g., a second loop-and-fastener pad). The second attachment mechanism is attached to a retrieval surface (e.g., the retrieval surface 22 of FIGS. 1-5).

Figure 8:
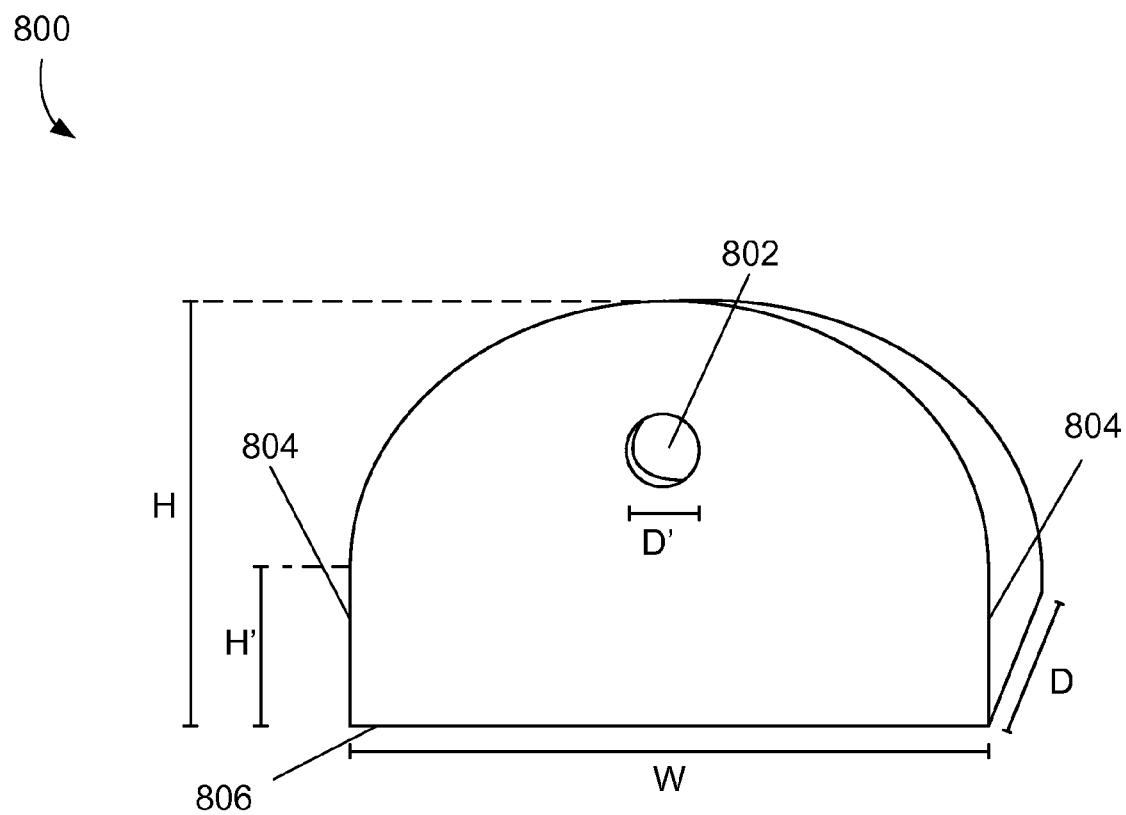
FIG. 8 is a front perspective view of yet another implementation of a block extension portion of a household retrieval device of this disclosure.

FIG. 8 shows a front perspective view of another implementation of a block extension portion 800. The block extension portion 800 is configured to be press fit into the slot 702 of the attachment block 700 of FIG. 7. The block extension portion 800 has a width, W, e.g., of about 1½ inches, a height, H, e.g., of about 2 inches, and a depth, D, e.g., of about ½ inch. Side surfaces 804 of the block extension portion have a straight portion and a curved portion. The straight portion has a height, H', e.g., of about ½ inch as measured from a bottom surface 806 of the block extension portion 800. The block extension portion 800 defines a through hole 802 that has a diameter, D', e.g., of about 3/16 inch. The center of the through hole 802 is positioned, e.g., about 1 inch vertically from the bottom surface 806 of the block extension portion 800. The through hole 802 can accept a fastener (e.g., the bolt 42 of FIGS. 2-3 and 4C), and the fastener can be received by a rod extension portion (e.g., the rod extension portion 16 of FIGS. 1-5). A threaded nut or knob (e.g., the threaded nut 44 of FIGS. 1-5) can be secured over the fastener, thereby fixing the block extension portion 800 to the rod extension portion. Alternatively, the fastener can be received directly by a through hole in a rod (e.g., the rod 16 of FIGS. 1-5), and a threaded nut or knob can be secured over the fastener, thereby fixing the block extension portion 800 to the rod.

Figure 9:
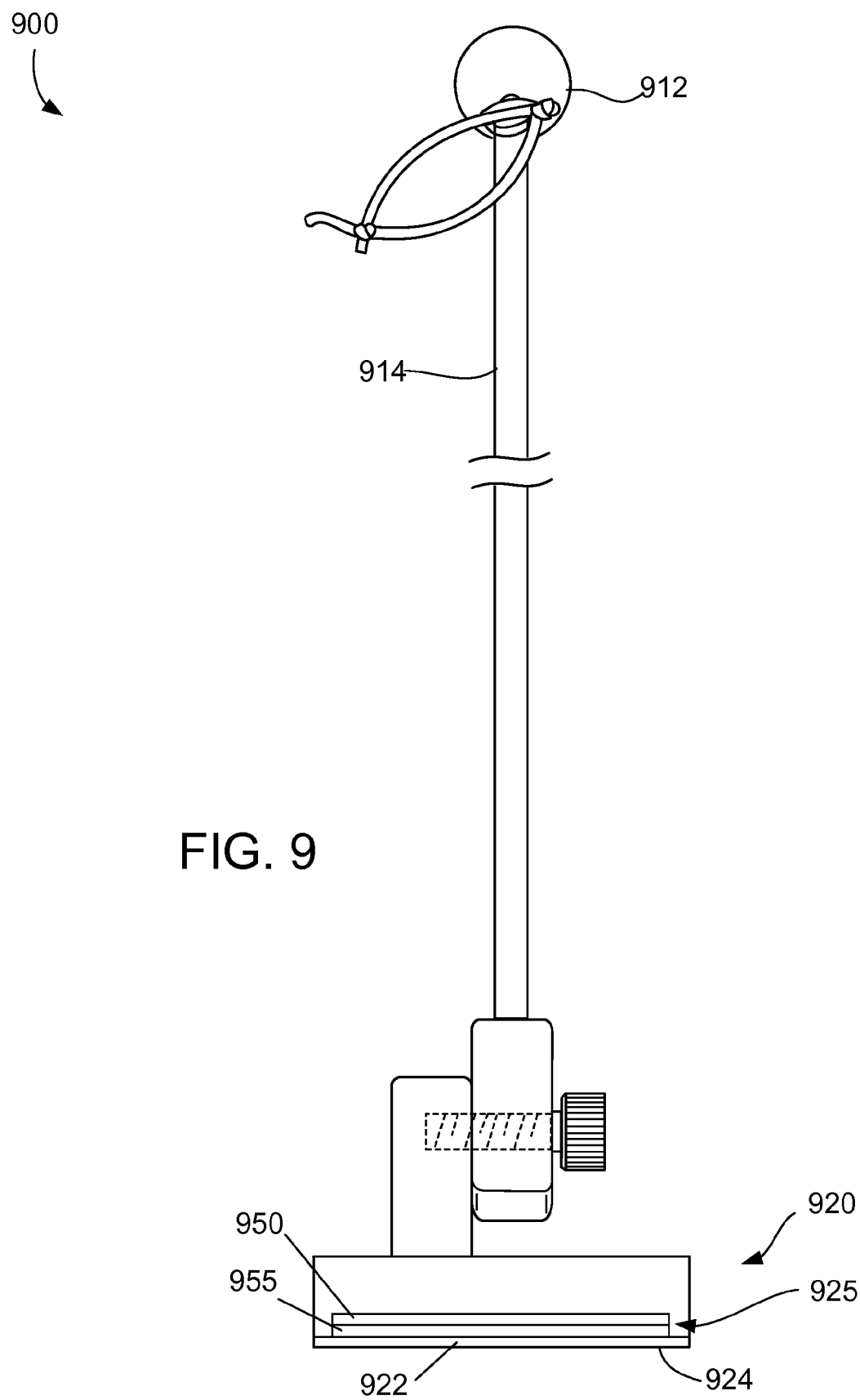
FIG. 9 is a front view of another implementation of a household retrieval device of this disclosure.

FIG. 9 shows a front view of another implementation of a retrieval tool 900 (e.g., a household retrieval device) of the disclosure. The retrieval tool 900 has an elongated rod member 914 having a first end and an opposite second end. A handle 912 is mounted at the first end of the rod and defines a user gripping surface. A retrieval member 920 mounted at the second end of the rod defines a cutout region 925 and includes a magnet (not shown). A first loop-and-fastener pad 950 is disposed in the cutout. A second loop-and-fastener pad 955 is disposed for attachment to the first loop-and-fastener pad 950. A lower planar retrieval surface 922 is attached to the second loop-and-fastener pad 955, the lower planar retrieval surface 922 defining a sticky surface region 924, both for attachment to and retrieval of a dropped and other item 2 (FIG. 1).

Other implementations are within the scope of the following claims.

What is claimed is:

1. A retrieval tool, comprising:
    an elongated rod member having a first end and an opposite second end;
    a handle mounted at the first end of the rod and defining a user gripping surface;
    a retrieval member mounted at the second end of the rod and defining a lower planar retrieval surface;
        the retrieval member comprising a magnet and the lower planar retrieval surface defining a sticky surface region, both for attachment and retrieval of a dropped and other item; and
    a pivot member disposed between the handle and the retrieval member and configured for adjustment of an angular relationship between the handle and the retrieval member surface,
    wherein the retrieval member has a first body portion attached to the pivot member and a second body portion selectively separable from the first body portion; and
    wherein the first body portion comprises alignment magnets that align and provide a holding force with alignment magnets in the second body portion when the first body portion is attached to the second body portion.

2. The retrieval tool of claim 1, wherein said second body portion comprises the magnet and the sticky surface region.

3. The retrieval tool of claim 1, wherein the sticky surface region comprises an elastomeric polymer.

4. The retrieval tool of claim 1, wherein the retrieval member is a square block.

5. The retrieval tool of claim 1 wherein the sticky surface region is removable.

6. The retrieval tool of claim 1, wherein the elongated rod member is selectively variable in length.

7. The retrieval tool of claim 6, wherein the elongated rod member is telescoping.

8. A retrieval tool, comprising:
    an elongated rod member having a first end and an opposite second end;
    a handle mounted at the first end of the rod and defining a user gripping surface;
    a retrieval member mounted at the second end of the rod and defining a lower planar retrieval surface;
        the retrieval member comprising a magnet and the lower planar retrieval surface defining a sticky surface region, both for attachment and retrieval of a dropped and other item; and
    a pivot member disposed between the handle and the retrieval member and configured for adjustment of an angular relationship between the handle and the retrieval member surface,
    wherein the retrieval member has a first body portion attached to the pivot member and a second body portion selectively separable from the first body portion; and
    wherein the pivot member is selectively movable between a first position locking the second body portion to the first body portion and a second position unlocking the second body portion from the first body portion.

9. The retrieval tool of claim 8, wherein, in the first position of the pivot member, locking the second body portion to the first body portion, the rod member is in a nonzero angle relative to a horizontal top surface of the retrieval member.

10. A retrieval tool, comprising:
    an elongated rod member having a first end and an opposite second end;
    a handle mounted at the first end of the rod and defining a user gripping surface;
    a retrieval member mounted at the second end of the rod and defining a lower planar retrieval surface;
        the retrieval member comprising a magnet and the lower planar retrieval surface defining a sticky surface region, both for attachment and retrieval of a dropped and other item;
    a pivot member disposed between the handle and the retrieval member and configured for adjustment of an angular relationship between the handle and the retrieval member surface;
        the retrieval member having a first body portion attached to the pivot member and a second body portion selectively separable from the first body portion, said second body portion comprising the magnet and the sticky surface region; and
    the first body portion comprising alignment magnets that align and provide a holding force with alignment magnets in the second body portion when the first body portion is attached to the second body portion.

11. A retrieval tool, comprising:
    an elongated rod member having a first end and an opposite second end;
    a handle mounted at the first end of the rod and defining a user gripping surface;
    retrieval member mounted at the second end of the rod and defining a lower planar retrieval surface;
        the retrieval member comprising a magnet and the lower planar retrieval surface defining a sticky surface region, both for attachment and retrieval of a dropped and other item;
    a pivot member disposed between the handle and the retrieval member and configured for adjustment of an angular relationship between the handle and the retrieval member surface;
        the retrieval member having a first body portion attached to the pivot member and a second body portion selectively separable from the first body portion, said second body portion comprising the magnet and the sticky surface region; and
        the pivot member being selectively movable between a first position locking the second body portion to the first body portion and a second position unlocking the second body portion for removal from the first body portion.

12. The retrieval tool of claim 11, wherein, in the first position of the pivot member, locking the second body portion to the first body portion, the rod member is in a nonzero angle relative to a horizontal top surface of the retrieval member.

13. The retrieval tool of claim 11, wherein the sticky surface region comprises an elastomeric polymer.

14. The retrieval tool of claim 11 wherein the sticky surface region is removable.

15. The retrieval tool of claim 11 wherein the sticky surface region is removable as a unit with said second body portion.

16. The retrieval tool of claim 11, wherein the elongated rod member is selectively variable in length.

17. The retrieval tool of claim 11, wherein the elongated rod member is telescoping.

18. A retrieval tool, comprising:
    an elongated rod member having a first end and an opposite second end;
    a handle mounted at the first end of the rod and defining a user gripping surface;
    a retrieval member mounted at the second end of the rod and having a lower planar retrieval surface, wherein the retrieval member defines a cutout,
    the retrieval member comprising a magnet;
    a first loop-and-fastener pad disposed in the cutout;
    a second loop-and-fastener pad for attachment to the first loop-and-fastener pad; and
    a pivot member disposed between the handle and the retrieval member and configured for adjustment of an angular relationship between the handle and the retrieval member surface;
    wherein the lower planar retrieval surface is attached to the second loop-and-fastener pad, the lower planar retrieval surface defining a sticky surface region, wherein the magnet and the sticky surface region are both for attachment and retrieval of a dropped and other item;
    wherein the retrieval member has a first body portion attached to the pivot member and a second body portion selectively separable from the first body portion, said second body portion comprising the lower planar retrieval surface; and
    wherein the first body portion comprises alignment magnets that align and provide a holding force with alignment magnets in the second body portion when the first body portion is attached to the second body portion.

\* \* \* \* \*